United States Patent [19]

Grinstead

[11] Patent Number: 4,708,854
[45] Date of Patent: Nov. 24, 1987

[54] PROCESS FOR THE REMOVAL OF NO FROM FLUID STREAMS USING A WATER-SOLUBLE POLYMERIC CHELATE OF A POLYVALENT METAL

[75] Inventor: Robert R. Grinstead, Walnut Creek, Calif.

[73] Assignee: The Dow Chemical Company, Midland, Mich.

[21] Appl. No.: 837,927

[22] Filed: Mar. 10, 1986

[51] Int. Cl.$^4$ .................... C01B 21/00; C01B 17/00; B01J 8/00
[52] U.S. Cl. .................... 423/235; 423/239; 423/242; 423/243; 423/244
[58] Field of Search ................ 423/235, 235 D, 239, 423/239 A, 242 A, 243 P, 244 A, 244 R

[56] References Cited

U.S. PATENT DOCUMENTS

| | | | |
|---|---|---|---|
| 3,932,585 | 1/1976 | Moriguchi et al. | 423/235 |
| 3,974,090 | 8/1976 | Mitchell | 252/389 A |
| 3,984,522 | 10/1976 | Saito et al. | 423/235 |
| 3,991,161 | 11/1976 | Saitoh et al. | 423/235 |
| 3,992,508 | 11/1976 | Saitoh et al. | 423/235 |
| 4,044,101 | 8/1977 | Hisamatsu et al. | 423/235 |
| 4,055,623 | 10/1977 | Saitoh et al. | 423/235 |
| 4,079,118 | 3/1978 | Gorai | 423/235 |
| 4,081,509 | 3/1978 | Hishinuma et al. | 423/235 |
| 4,087,372 | 5/1978 | Saitoh et al. | 252/184 |
| 4,091,074 | 5/1978 | Gorai et al. | 423/235 |
| 4,113,837 | 9/1978 | Kendall et al. | 423/242 |
| 4,126,529 | 11/1978 | DeBerry | 423/242 X |
| 4,347,227 | 8/1982 | Haas et al. | 423/235 |
| 4,386,058 | 5/1983 | Hass | 423/235 |
| 4,423,158 | 12/1983 | Porath | 521/32 |
| 4,448,899 | 5/1984 | Haas et al. | 423/235 |
| 4,518,745 | 5/1985 | Engelhardt et al. | 525/326.6 |

FOREIGN PATENT DOCUMENTS 53-34679 3/1978 Japan ................................ 423/242

OTHER PUBLICATIONS

G. Grillot et al., "The Condensation of Diethylamine and Formaldehyde with Phenol, o-, m-, p-Cresols", JACS, vol. 67, pp. 1968-1969 (1945).
P. R. Klinkowski, "Ultrafiltration", Kirk-Othmer: Encyclopedia of Chemical Technology, vol. 23, pp. 439-461 (1983).
E. F. Leonard, "Dialysis", Kirk-Othmer—Encyclopedia of Chemical Technology, vol. 7, pp. 564-579 (1979).

Primary Examiner—Gregory A. Heller

[57] ABSTRACT

The present invention relates to a cyclic continuous process and compositon for the removal of NO and SO$_2$ from a variety of fluid streams. A fluid stream containing NO and SO$_2$ is contacted with an aqueous solutin of water-soluble organic polymeric chelate containing a polyvalent metal, e.g., Fe (II). The NO is catalytically absorbed and in the presence of SO$_2$, the imidodisulfonate is formed. Optionally, a reducing agent, such as sodium hydrogen sulfide, is added to maintain the polyvalent metal in the reduced state. The process next includes removal of the imidodisulfonate formed. The separation of water and low molecular weight materials and products, e.g. molecular weight below 500, usually occurs by ultrafiltration or dialysis, with recycle and re-use of the polyvalent metal chelate.

17 Claims, 2 Drawing Figures

POLYCHELATOR / ULTRAFILTER SCRUBBER SYSTEM
for $SO_2$ and NO REMOVAL

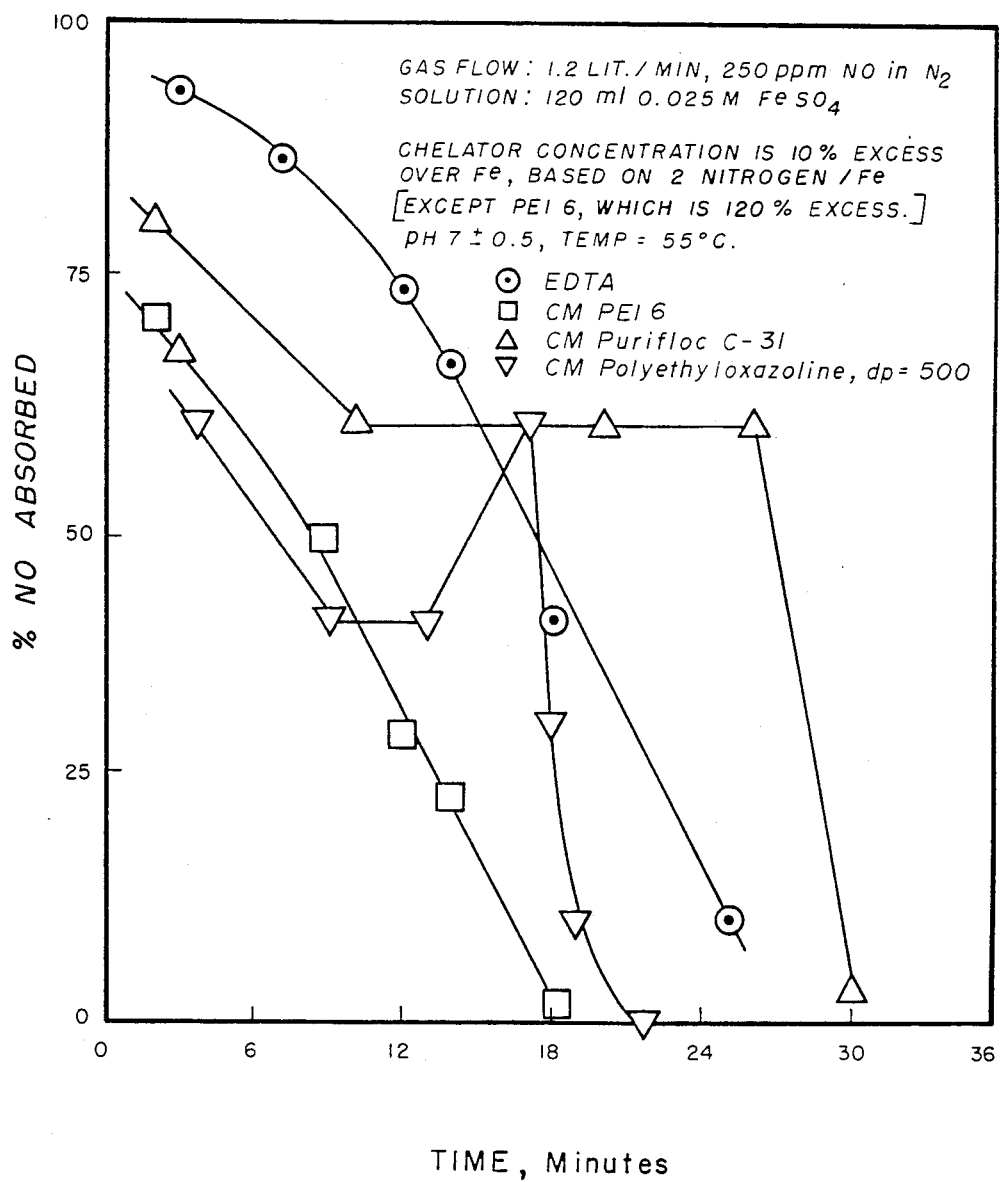

PROCESS FOR THE REMOVAL OF NO FROM FLUID STREAMS USING A WATER-SOLUBLE POLYMERIC CHELATE OF A POLYVALENT METAL

BACKGROUND OF THE INVENTION

1. Field of the Invention

This invention relates to a process wherein a fluid stream comprising a noxious gas, e.g., nitric oxide (NO), and sulfur dioxide ($SO_2$) is treated with a water-soluble polymeric chelate of a polyvalent metal to adsorb the nitric oxide. Water and the imidodisulfonate subsequently formed are separated from the polymeric chelate by means such as dialysis or ultrafiltration. The polyvalent metal chelate is then recycled and re-used. More specifically, the present invention relates to a process of removing NO from a gas stream using an aqueous solution of a water-soluble polymeric chelate of iron in the Fe (II) state, separating the imidosulfonate and a portion of the water by concentrating the aqueous water-soluble polymeric chelate of iron using ultrafiltration or dialysis, and recycling and re-using the polymeric chelate of iron (II).

2. Relevant Art

R. H. Hass in U.S. Pat. No. 4,448,899 discloses a process for removing NO from a gas stream by absorption with a water-soluble iron (II) chelate. The $SO_x$ and NO pollutants dissolved in the absorbent during regeneration are converted to hydrogen sulfide and nitrogen, respectively.

J. O. Porath in U.S. Pat. No. 4,423,158 discloses introducing a monomeric chelate-forming group into a polymer such as polystyrene. There is obtained an adsorbant for bivalent or multivalent metal ions which are useful in ion-exchange chromatography. The reference does not disclose the water-soluble polymeric chelates of the present invention which are useful to remove noxious NO from fluid streams.

U.S. Pat. Nos. 3,984,522 and 4,044,101, assigned to Asahi, disclose a process for removing NO from a gas stream the use of a solution containing a monomeric iron chelate and sulfite or sulfide. There is no disclosure regarding using a polymeric chelate of a metal, with separation of water and low molecular weight products and materials, from the chelate.

U.S. Pat. Nos. 4,079,118 and 4,091,074, assigned to Chisso Engineering Company, Ltd., disclose a process for the absorption of NO in a solution of ferric (or ferrous ion-ethylenediamine tetraacetic acid (EDTA) and sulfite. The liquid is treated to recover $SO_2$, then by a complex procedure recovers iron by alkaline precipitation with recycle of the iron and EDTA and separation of the dithionate and other products for disposal. In this process, monomeric EDTA is lost by the system.

In U.S. Pat. Nos. 3,991,161; 3,992,508; 4,055,623 and 4,087,372, assigned to Kureha Kagaku Kogyo KK, are disclosed processes for absorbing NO in sulfite solutions containing iron salts to produce imidodisulfonates with subsequent hydrolysis to ammonium sulfate. There is no discussion of polymeric chelates or the problems encountered during the separation of excess water and buildup of products, by-products and materials.

Additional U.S. patents of general interest include U.S. Pat. Nos. 3,932,585; 4,081,509 and 4,126,529.

It is known by the number of techniques described above to treat a stack gas with a monomeric organic chelate of iron (II). A problem with these processes is that the efficient separation of excess water, products which build up during the reaction and byproducts from the monomeric organic chelate of iron (II) from the aqueous stream is usually difficult and very costly. A portion of the expensive iron-monomeric organic chelate is lost during separation of the low molecular weight materials, and cannot be recovered. It is therefore highly desirable to have a process where the expensive organic polymeric iron (III) or iron (II) chelate is separated easily from a waste stream originally containing NO, where the organic polymeric chelate of iron is recycled and used again and again.

SUMMARY OF THE INVENTION

A process for the removal of NO from a fluid stream comprising mixtures of NO and $SO_2$, which process comprises:

(A) contacting the fluid stream in a contacting zone with an aqueous reaction solution at a temperature between about 10° and 90° C., the reaction solution itself comprising an effective amount of an organic water-soluble polymeric chelate containing a polyvalent metal;

(B) separating the treated fluid stream and chelate-containing aqueous phase produced in step (A);

(C) treating the aqueous organic polymeric chelate of step (B) by means effective to remove a portion of the water and other monomeric reaction products having a molecular weight of less than 500; and (D) recycling the concentrated and purified aqueous solution of step (C) to the contacting zone of step (A).

In a preferred embodiment, the polyvalent metal in the chelate is iron (II).

In another preferred embodiment, in step (C), a portion of the aqueous solution is separated from the polymeric chelate by means selected from ultrafiltration or dialysis.

BRIEF DESCRIPTION OF THE FIGURES

FIG. 2 shows a comparison of the saturation capacity of the iron (II) chelates to remove NO.

DETAILED DESCRIPTION AND PREFERRED EMBODIMENTS

Figure 1:
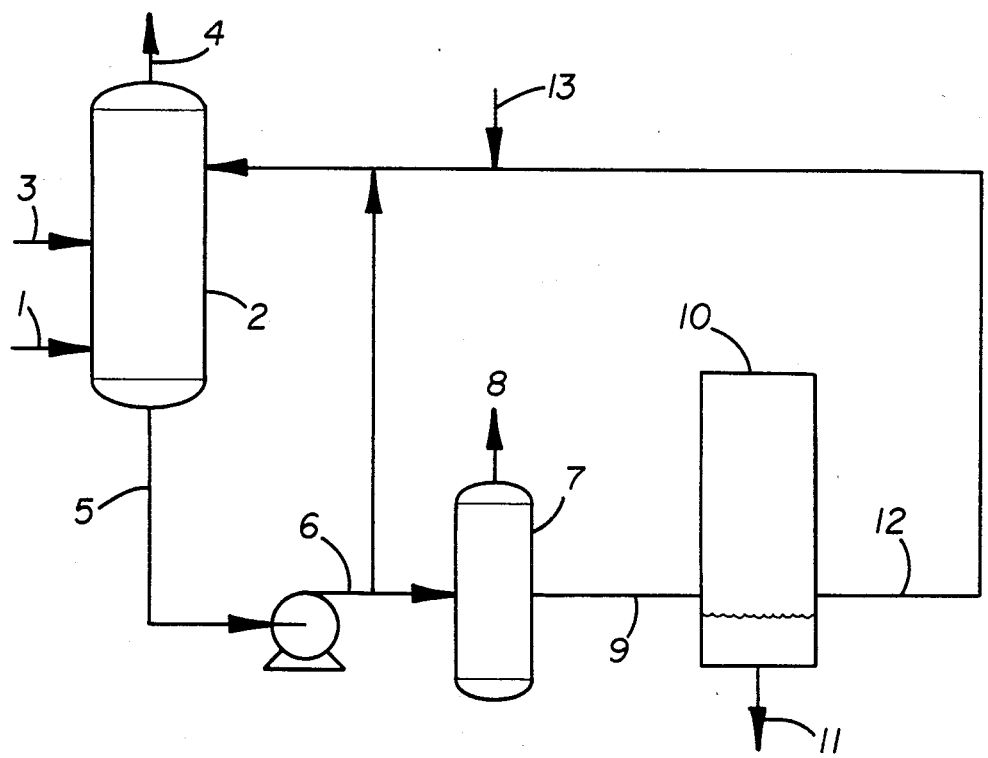
FIG. 1 illustrates a process in which an aqueous solution of an organic polymeric chelate of a polyvalent metal of this invention is applied to the removal of NO and $SO_2$ contained in a fluid stream, such as from a stack gas from a power plant. The organic polymeric chelate of ferrous (II) ion.NO is a transient intermediate which instantaneously reacts with the bisulfite $HSO_3^-$ formed by the reaction of $SO_2$ with water to form the imidodisulfonate ion $HN(SO_3)_2^=$. A portion of the water is separated from water and low molecular weight material using dialysis or ultrafiltration techniques. The organic polymeric chelate of ferric ion is continuously recycled and re-used. The process eliminates the environmental pollution problem associated with the discharge of an effluent stream containing toxic and noxious nitric oxide.

This section is organized in the following order: fluid streams, the water-soluble polymeric chelates, the polyvalent metals and the separation means for water and low molecular weight materials. In the following section under Detailed Description of the Figures, the process and results are discussed.

Fluid Streams

In the present invention, "fluid stream" refers to any gaseous, liquid or combination gaseous-liquid stream. These fluid streams include, for example, stack gases from a power plant, combustion gases from the burning of natural gas, petroleum, oil shale, coal and the like.

The Water-Soluble Polymeric Chelates

Any otherwise inert water-soluble polymeric chelate capable of chelating a polyvalent metal is suitable in the present process. Inert in this context is defined as not detrimentally reactive in the reaction to an intolerable extent. Polymeric chelates having a molecular weight between about 500 and 1,000,000 are preferred in the present process. Polymeric chelates having a molecular weight between 1000 and 500,000 are more preferred.

Those polymers having a backbone chain with pendant groups capable of chelating metals are preferred. More preferred water-soluble polymeric chelates (having pendant chelating groups) include, for example, the following repeating polymeric groups:

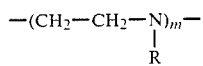
(a)

wherein R is —CH$_2$COOH, —CH$_2$CH$_2$COOH, —CH$_2$—P(=O)(OH)$_2$, or

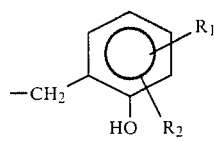

wherein R$_1$ and R$_2$ are independently —CH$_3$, —SO$_3$H, —Cl, —H, —COOH, and m is an integer between about 5 and 20,000;

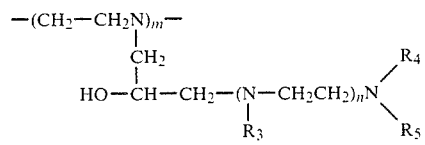
(b)

wherein R$_3$, R$_4$ and R$_5$ are independently selected from R, wherein R is as defined hereinabove, m is an integer between about 5 and 20,000; and n is 0, 1, 2, 3 or 4;

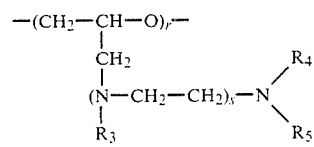
(c)

wherein R$_3$, R$_4$ and R$_5$ are as defined hereinabove; r is an integer between about 10 and 20,000, s is an integer between about 1 and 4;

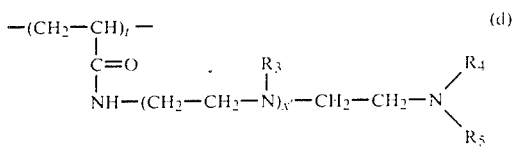
(d)

wherein R$_3$, R$_4$ and R$_5$ are as defined hereinabove; t is an integer between about 10 and 20,000 and x' is an integer between about 1 and 4;

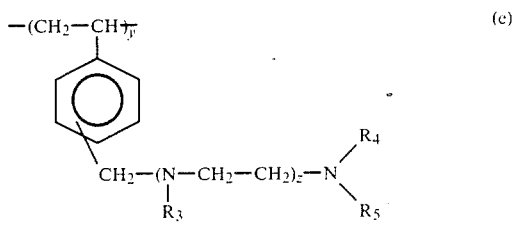
(e)

wherein R$_3$, R$_4$ and R$_5$ are as is defined hereinabove, y is an integer between about 10 and 20,000; z is an integer between about 1 and 4;

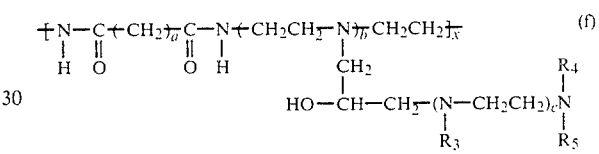
(f)

wherein R$_3$, R$_4$ and R$_5$ are as defined hereinabove, x is between about 10 to 10,000, a is about 6, b is between about 1 and 4, and c is between about 1 and 4;

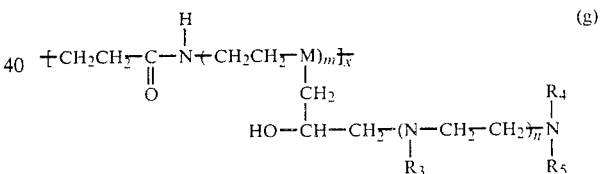
(g)

where m, x, n and R$_3$, R$_4$ and R$_5$ are as defined hereinabove; or

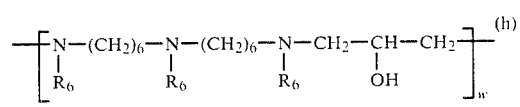
(h)

wherein R$_6$ is —CH$_2$ or —H;

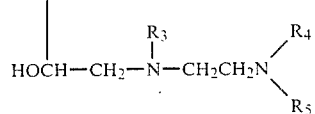

wherein R$_3$, R$_4$ and R$_5$ are as defined hereinabove; and w is between about 2000 and 4000;

(B) separating the gas stream and aqueous solution comprising the polymeric chelate metal and imidodisulfonate of step (A);

(C) concentrating the aqueous solution of step (B) by means effective to remove water and other monomeric low molecular weight reaction products; and (D) recycling the concentrated aqueous solution of step (C) to the contacting zone of step (A).

It is also contemplated that mixtures of the water-soluble organic polymeric chelates described hereinabove are useful in the present invention. The concentration of the polymer should be at a level so as to provide up to about 1-gram equivalent weight of the chelating group per liter of solution.

A more detailed description of the preparation for these various organic polymeric chelates is provided below and as part of the Examples. Some polyamines and polyethers used in synthesis are described in Table 1 below.

TABLE 1
POLYAMINES USED AS STARTING MATERIALS FOR POLYCHELATOR SYNTHESIS

| Amine$^a$ | Degree of Polym. (D.P.) | Molecular Weight Range | Nature of Chain |
|---|---|---|---|
| E-100$^b$ | 6 | 250–300 | Branched |
| PEI-6 | 15 | 600 | Branched |
| Hydrolyzed PEOx | 50$^c$ | 2000 | Linear |
| Purifloc C-31$^d$ | 500 | 10,000–30,000 | Branched |
| Hydrolyzed PEOx | 500$^f$ | 20,000 | Linear |
| PEI-600 | 1500 | 60,000 | Branched |
| Hydrolyzed PEOx | 5000$^g$ | 500,000 | Linear |

$^a$PEI = polyethyleneimine. PEOx, polyethyloxazoline. PEI is a polymer of molecular weight 60,000 (CORCAT 600) and is obtained from Cordova Chemical Company. The nitrogen content is determined by drying a sample, and elemental analysis of the solid.
$^b$E-100 - is a byproduct of ethylenediamine manufacture and is a low molecular weight branched polymer containing about six ethyleneamine groups.
$^c$100% hydrolyzed
$^d$Purifloc C-31 - is a polyethylene amine product of the Dow Chemical Company, Midland, Michigan.
$^e$Probably also partially crosslinked.
$^f$85% hydrolyzed
$^g$97% hydrolyzed One embodiment of the chelate designated (a)

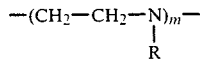

where R is —CH$_2$COOH (CHELATE A) is prepared by dissolving polyethyleneimine (CORCAT 150 or CORCAT 600, available from the Cordova Chemical Company) in water followed by reaction with excess sodium chloroacetate in the presence of strong base.

Another embodiment of the polymeric chelate designated

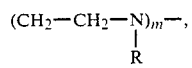  (a)

where R is —CH$_2$P(=O)(OH)$_2$ (CHELATE B) prepared by dissolving polyethyleneimine in water and reaction with phosphoric acid and formaldehyde. The process described by R. S. Mitchell in U.S. Pat. No. 3,974,090 for the monomer may be adapted using the polymeric imine.

A further embodiment of the polymeric chelate (a) designated

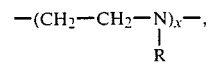

where R is:

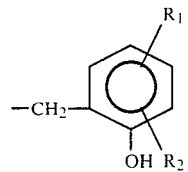

and R$_1$ and R$_2$ are each methyl (CHELATE C), is obtained by dissolving polyethyleneimine in water followed by treatment with 2,4-dimethylphenol and formaldehyde. The general procedure described by G. Grillot and W. Gormley, Jr., *J. Amer. Chem. Soc.*, Vol. 67, pp. 1968ff (1945) for the monomer is adapted using the polymeric imine.

One embodiment of the polymeric chelate designated (b) where R is —CH$_2$COOH and n is 1 (CHELATE D), is obtained by first reacting epichlorohydrin,

with ethylenediamine-triacetic acid to produce Cl—CH$_2$—CH(OH)CH$_2$—N—(CH$_2$COOH)CH$_2$CH$_2$N(CH$_2$COOH)$_2$, followed by reaction with polyethyleneimine. The procedure described above, for CHELATE A, may also be adapted. For those polymers where n is 2, 3 or 4, the ethylenediamine is replaced with the corresponding diethylenetriamine, triethylenetetraamine and tetraethylene-pentamine, respectively.

Another embodiment is of the polymeric chelate designated (b) where p is about 20,000, q is 0, and R$_4$ and R$_5$ are each —CH$_2$COOH (CHELATE D-1), iminodiacetic acid is dissolved in water and epichlorohydrin, about a 20% excess is added. The product is extracted with a chlorinated hydrocarbon such as methylene chloride to remove the unreacted epichlorhydrin. To this aqueous solution is added a 33% aqueous solution of polyethyleneimine, e.g., CORCAT 600, the solution is heated and further treated with sodium hydroxide at a pH 9–10. The chelate solution is used without further purification.

One embodiment of the polymeric chelate designated (c) where R$_3$, R$_4$ and R$_5$ are each —CH$_2$COOH (CHELATE E) is prepared by treating polyepichlorohydrin with ethylenediamine in the presence of base followed by treatment with excess sodium chloroacetate.

One embodiment of the chelate designated (d) where t is 100, x' is 1 and R$_3$, R$_4$ and R$_5$ are each —CH$_2$COOH (CHELATE F) is prepared by the treatment of poly(ethylacrylate) with diethylenetriamine followed by treatment with sodium chloroacetate in the presence of a strong base.

One embodiment of the chelate designated (e) where R$_3$, R$_4$ and R$_5$ are each —CH$_2$COOH, y is 100 and z is 1 (CHELATE G) is the treatment of poly(vinylbenzylchloride) with ethylenediamine in the presence of strong base. The product in the presence of base, is next treated with excess sodium chloroacetate. By replacement of ethylenediamine with diethylenetriamine, triethylene tetraamine, and the like, the higher homologues are produced.

One embodiment of the chelate designated (f) where R is —CH$_2$COOH and e is 1 (CHELATE H) is obtained by the treatment of the commercial polymer KYMENE 557H which is obtained from the Hercules Corporation of Wilmington, Del., with ethyenediamine triacetic acid.

One embodiment of the chelate designated (g) where R is —$CH_2COOH$ and n is O (CHELATE J), is obtained by reacting the polymer of methylacrylate and ethylenediamine with the epoxide adduct formed by the treatment of iminodiacetic acid with epichlorohydrin.

One embodiment of the chelate designated (h) where $R_6$ is the adduct, is obtained by reacting the commercially available FIBRABON 35 from the Diamond Shamrock Co., Cleveland, Ohio with ethylenediaminetriacetic acid in the presence of base (CHELATE K).

A more detailed description of the preparation for these organic polymeric chelates is provided below as part of the Examples.

The Polyvalent Metals

Generally, any polyvalent metal can be used in the present invention as the metal component of the polymeric chelate to remove NO, but iron, copper, cobalt and manganese are preferred. Iron is particularly preferred. The polyvalent metal chelate should be capable of acting as a catalyst to instantaneously complex NO and should then be capable of regeneration.

Separation Means for Water and Low Molecular Weight Materials

The means to separate the organic polymeric chelate from the water and water-soluble low molecular weight products and materials can employ any single or combination of techniques suitable for this purpose. Preferably, ultrafiltration or dialysis are used. More preferably, ultrafiltration is employed using a membrane consisting of any of a variety of synthetic polymers in the shape of a film, hollow fiber or the like. Particularly useful for the removal of water while retaining the water-soluble polymeric chelate are membranes such as Spectrapor 6 (2000 molecular weight maximum permeability).

The use of ultrafiltration membranes in the separation of components of an aqueous solution is described by P. R. Klinkowski in *Kirk-Othmer: Encyclopedia of Chemical Technology,* Vol. 23, pages 439–461, which is incorporated herein by reference. The use of dialysis membranes in separation is described by E. F. Leonard in *Kirk-Othmer: Encyclopedia of Chemical Technology,* Vol. 7, pages 564–579, which is incorporated herein by reference.

DETAILED DESCRIPTION OF THE FIGURES

In FIG. 1, the gas stream is, for example, from a stack gas containing up to about 1.0 percent by volume of NO, preferably between about 0.02 and 0.05 percent by volume, or a chemical stream containing up to about 1.0 percent by volume of NO. In some gas streams, the NO is about 250 parts per million (p.p.m.). Sulfur dioxide ($SO_2$) is also normally a product of combustion. In the present process the $SO_2$ content is generally between about 0.05 and 0.02 percent by volume. The gas stream (line 1) enters column 2 which contains an aqueous admixture comprising an aqueous solution about 1-molar and a water-soluble polymeric chelate containing a polyvalent metal. Fe(II) is preferred and will be used hereafter. It is understood that Fe(III) (oxidized form) and Fe(II) (reduced form) will be representative of any comparable polyvalent metal. The pressure of the feed gas is generally not critical and may vary from between about 10 and 100 pounds per square inch gauge (psig), preferably between about 15 and 50 psig. Optionally, a reducing agent is added to the process in an amount effective to reduce the chelate Fe(III) to chelate Fe(II). A preferred reducing agent is an aqueous solution of NaSH. The reducing agent may be added through any of the lines of FIG. 1 in which aqueous solution is added. Preferably, the NaSH solution is added through line 13.

A fresh aqueous solution of the polymeric chelate Fe(II) described above is added through line 3. Usually the gas stream is simply contacted with the aqueous stream, although a countercurrent configuration of the gas rising through a column of aqueous chelate solution is preferred. The temperature of the aqueous admixture is between about 10° and 90° C., with a temperature between about 20° and 80° C. being preferred. A more preferred temperature is between about 50° and 70° C. A contact time between the aqueous admixture and the gas is usually about 1 sec and 2 min, with between about 2 sec and 1 min being preferred. This time period is sufficient to adsorb substantially all of the NO to the Fe(II) chelate and to react with the bisulfite present to produce the imidodisulfonate. It has been determined that a 0.05M Fe(II)-EDTA process requires a residence time of about 2–3 seconds to remove 90% of the NO from a gas stream containing 250 ppm of NO, while a CM PEI 150 system under the same process conditions requires about 15 seconds of residence time.

The purified gas stream then leaves column 2 via line 4. Generally, the purified gas exiting in line 4 meets standard environmental emission standards.

In the aqueous admixture, the NO has been converted by the Fe(II)-containing polymeric chelate to chelate .Fe(II). NO, which instantaneously combines with $HSO_3^-$ present to produce primarily iminodisulfonate. Other products are possible, but the predominant reaction is:

$$2NO + 5HSO_3^- \rightarrow 2HN(SO_3)_2^= + SO_4^= + H^+ + H_2O$$

The aqueous mixture containing $HN(SO_3)_2^=$ and water-soluble polymeric chelate of Fe(II) is removed in a continuous manner through line 5, optionally to a pump and through line 6 to a degassing and depressurization unit 7. Additional gases are evolved through line 8.

The polymeric chelate-containing aqueous solution is conveyed via line 9 to a separator unit 10. Separator 10 uses means to separate excess water, imidodisulfonate and low molecular weight products and byproducts. Generally, ultrafiltration or dialysis is used, with ultrafiltration being preferred. The water and low molecular weight materials, such as inorganic products, etc. having a molecular weight of less than 1000, preferably less than 500, are conveyed away through line 11 and disposed of in an environmentally acceptable manner. The polymeric chelate is then conveyed through line 12. Some permeabilities of monomeric and polymeric chelates of iron (II) and iron (III) using ultrafiltration and dialysis are shown below, in Table II in Example 9.

The polymeric chelate containing the polymeric chelate metal Fe(II) is then conveyed through line 12 to contacting zone 2 to begin the reaction process cycle again. As needed, make-up water, polymeric chelate and polyvalent metal are added to the process through line 13.

In FIG. 2 is shown, the time needed to saturate the iron (II) chelate with NO. About 24 minutes is needed to saturate the monomeric EDTA.FE(II) with NO. The polymeric .FE(II) chelates show saturation of NO under comparable conditions, e.g., between about 18 and 30 minutes. show absorption of NO between 18 and 30 minutes. FIG. 2 shows that the polymeric chelates of Fe(II) have comparable absorption of NO under similar conditions.

The following Examples are to be construed as being illustrative and are not to be limiting in any way.

EXAMPLE 1

Preparation of Polymeric Chelate (a)

Based on Polyethyleneimine (PEI)

[CHELATE A: R=—CH$_2$COOH]

(a) Polyethyleneimine 11 g [degree of polymerization (DP) 1500] is dissolved in water (200 ml) to produce a solution of 1.25 molar (in amine nitrogen). To the aqueous solution is added sodium chloroacetate (31 g, a 5% excess) with stirring while maintaining the reaction mixture of about 60° C. A pH electrode is used to monitor the reaction and 50% sodium hydroxide is added to maintain the pH above about 10. After 40 minutes of reaction the reaction is complete, and the reaction mixture is allowed to cool. The aqueous solution is diluted to 1.0M (amine nitrogen) and used without further purification.

EXAMPLE 1A

Preparation of Polymeric Chelate (a)

[CHELATE B: R=—CH$_2$P(=O)(OH)$_2$]

To a 500 ml flask equipped with a water condenser and dropping funnel is added 99 g (0.6 mole) of 49.9% orthophosphorous acid (which also contained 9.4 g of hydrogen chloride) and 5.2 g of 37% hydrochloric acid. The total moles of hydrogen chloride used is 0.4. The resultant mixture is then allowed to heat by the addition of 14 g of CORCAT 150 (Cordova Chemical Co.) as a 33% aqueous solution of polyethyleneimine containing 0.1 mole of amine nitrogen. The polyamine is added over a period of 8 to 10 minutes while the reaction mixture achieves a temperature of about 70°–75° C. The reaction mixture is then heated for about 20 minutes to the boiling temperature thereby producing a homogenous clear solution having a boiling point of between 110°–115° C. The resulting clear aqueous solution is maintained at boiling for about 2 hrs., and 22 g (0.66 mole) of paraformaldehyde is added. After the 2-hr. period, the clear reaction mixture is kept boiling for an additional 30 min and cooled to about 25°–30° C. The clear solution has an amber color, and contains about 50% by weight of the polyethyleneimine phosphonate which was used without further purification.

EXAMPLE 1B

Preparation of Polymeric Chelate (a)

[CHELATE C: R is 6-methylene-2,4-dimethylphenol]

To a 13 g aqueous solution (33%) of polyethyleneimine CORCAT 150 (from Cordova Chemical Company) containing 0.01 mole of available amine nitrogen is added 10.8 g of p-cresol (0.1 mole). The solution is maintained below 20° C., while a 37% aqueous formaldehyde solution (0.11 mole) is added slowly with stirring. The solution is allowed to stand for an hour at ambient temperature and then warmed to 80° C. for 2 hrs. The aqueous solution is used without purification in subsequent experiments.

EXAMPLE 2

Preparation of Polymeric Chelate (b)

[CHELATE D: R$_3$, R$_4$ and R$_5$ are —CH$_2$COOH]

This preparation was performed in two steps: (1) attachment of ethylenediamine to the polymer; and (2) conversion of the amine to the ED3A.

Step 1:

23.5 Grams of polyepichlorhydrin (0.25 Mole monomer unit) and 94 grams of 85% ethylenediamine (1.3 moles) were dissolved in 50 ml isopropanol and 25 ml of toluene and refluxed (about 100° C.) for six hrs. As the reaction proceeded additional isopropanol was added to maintain homogeneity, with the final system being about 75/25 isopropanol/toluene. The reaction was followed by titrating aliquots for chloride ion with silver nitrate. Next, 20 grams of 50% NaOH (0.25 mole) was added, the solid NaCl which formed was filtered, washed with ethanol, and the liquid was removed in a vacuum evaporator at 55° C. Although some NaCl remained in the product, the elemental analysis gave a C:H:N mole ratio of 4.6:12.1:2.00 (Expected mole ratio was 5:12:2).

Step 2:

This intermediate was taken up to about 200 ml of water, to which 3.3 moles of sodium chloroacetate was added per mole of nitrogen. The system was kept at about 60° C. and a pH of about 10 for about one hr. At this point a white precipitate (presumably NaCl) was filtered off, the pH was adjusted to about 2 (the expected isoelectric point), at which point considerable while solid formed. This solid was filtered and found to be EDTA, presumably formed because all of the unreacted ethylenediamine had not been removed during the vacuum evaporation. The filtrate was dialyzed against about 4 liters of water.

An estimate of the ethylenediaminetriacetic acid content of the dialyzed (polymeric) material was made by titrating an aliquot with iron (III). About one-third of the expected chelant groups were found in the polymer fraction.

EXAMPLE 2A

Preparation of Polymeric Chelate (b)

[CHELATE D-1: p=20,000, q=0 and R$_4$ and R$_5$ are —CH$_2$COOH]

14.3 Grams (0.1 mole) of iminodiacetic acid was dissolved in 100 ml of water. To this solution was added 0.12 mole epichlorhydrin, about a 20% excess. After allowing the solution to stand for an hour at ambient temperature it was extracted with 50 ml of methylene chloride to remove the unreacted epichlorhydrin. To the aqueous phase from this extraction was added 14.7 grams of a 33% solution of polyethyleneimine CORCAT 600 (Cordova Chem. Co., Muskegon, Mich.), an amount determined to contain 0.1 mole of nitrogen. The solution was heated to 60° C., while sodium hydroxide solution (10N) was added at a rate sufficient to maintain the pH in the range of 9–10. After about 30 minutes the reaction was complete and the resulting solution, which now contained the polyethyleneimine with iminodiacetic acid groups attached to it, was used without purification in subsequent experiments.

EXAMPLE 3

Preparation of Polymeric Chelate (c)

[CHELATE E: $R_3$, $R_4$ and $R_5$ are —$CH_2COOH$]

22.4 Grams (0.1 mole) of ethylenediamine triacetic acid is dissolved in 100 ml of water. To this solution is added 0.12 mole of polyepichlorohydrin (HYDRIN 10×1 DP~40), (B. F. Goodrich, Cleveland, Ohio), about a 20% excess in 100 ml of toluene/methylene chloride (50/50; v/v). To this two-phase solution is added 0.01 mole of tetrabutyl ammonium chloride as a phase transfer catalyst. The solution is allowed to stir vigorously for about an hour at ambient temperature. The HCl produced is taken up by the addition of sodium hydroxide. The aqueous polymeric chelate was subsequently used without purification.

EXAMPLE 4

Preparation of Polymeric Chelate (d)

[CHELATE F: $R_3$, $R_4$ and $R_5$ are —$CH_2COOH$, t is 100 and x' is 1]

Poly(methylacrylate) (86 g., equivalent to one mole of formula weight of the monomeric methyl acrylate) is dissolved in about 300 ml of toluene, and 520 g of diethylenetriamine (5 moles) were added. The solution is heated at 40°-50° C. for an hour and the excess amine and toluene were evaporated under vacuum. The residue is taken up in 500 ml of water and 348 g. of sodium chloroacetate (3.0 mol) are added to the solution, and heated to about 60° C. for about 30 minutes while sodium hydroxide is added at a rate sufficient to maintain the pH at 9-10. This solution, which had the desired structure is used without further purification in subsequent experiments.

EXAMPLE 5

Preparation of Polymeric Chelate (e)

[CHELATE G: $R_3$, $R_4$ and $R_5$ are —$CH_2COOH$, y is 100 and z is 1]

Polyvinylbenzyl chloride (15 g., equivalent to 0.1 mole of monomer units) is dissolved in 100 ml of methylene chloride, and 30 g of ethylene diamine (0.5 mole) are added. The solution is warmed to 40° C. and stirred for 2 hours. The excess amine and methylene chloride are evaporated under vacuum. The resulting polymer is taken up in 200 ml of water and carboxymethylated as in the preceding example. The resulting polymer has the desired structure, and is used further without purification.

EXAMPLE 6

Preparation of Polymeric Chelate (f)

[CHELATE H: $R_3$, $R_4$ and $R_5$ are —$CH_2COOH$]

Eighty grams of the polymer KYMENE 557H (0.1 mole monomer equivalent) (Hercules Corporation, Wilmington, Del.), which is a copolymer of adipic acid, diethylenetriamine and epichlorhydrin was added to a solution of 46 g of ethylenediaminetriacetic acid in about 200 ml of water (a twofold excess). The solution was heated to 80° C. for two hours. The resulting solution which contained the desired polymer (vi) was used without further purification in subsequent experiments.

EXAMPLE 7

Preparation of Polymeric Chelate (g)

[CHELATE J; $R_3$, $R_4$ and $R_5$ are —$CH_2COOH$]

A solution of an adduct of epichlorhydrin and iminodiacetic acid, as prepared in Example 2A, is added to an equimolar quantity of a polymer solution made by reacting equimolar quantities of methyl acrylate and ethylenediamine. The solution is heated to 80° C. for 2 hours, and the resulting polymer is used in subsequent experiments.

EXAMPLE 8

Preparation of Polymeric Chelate (h)

[CHELATE K]

Fifty four grams of the commerical polymer FIBRABON 35 (Diamond Shamrock Corporation, Cleveland, Ohio) which contains 100 millimoles of active epichlorhydrin groups, is mixed with a solution of 46 grams of ethylenediaminetriacetic acid (0.2 mole), the solution is heated to 60° C. and sodium hydroxide is added at a rate sufficient to maintain the pH at about 9-10. After about 2 hours, the reaction is over, and the solution is used in subsequent experiments.

EXAMPLE 9

Chelation of Iron (II) by Polymeric Chelating Agents

Various polymeric chelates are obtained by treating the polymeric chelant with iron at pH 7. The results of these reactions is shown in Table II.

TABLE II

CHELATION OF IRON (II) BY POLYMERIC CHELATING AGENTS

Ratio W is the mole ratio of nitrogen in chelating monomer or polymer to iron at point of incipient precipiation at room temperature. pH in all tests is 7 ± 0.5.

| Chelator | (Fe), Molar | W |
|---|---|---|
| EDTA | 0.03 | 2.0 |
| MBEDTA | 0.03 | 2.2 |
| Sym. EDDA | 0.03 | >10 |
| DTDA | 0.015 | >9 |
| DTPA | 0.03 | 2.5 |
| TTHA | 0.05 | 2.3 |
| CM E-100 | 0.04 | 3.4 |
| CM PEI 6 | 0.045 | 3.2 |
| CM PEOx, DP-50 | 0.025 | 5 |
| CM PEOx, DP-1000 | 0.025 | 4 |
| CM PEOx, DP-10,000 | 0.015 | 4.2 |
| CM C-31 (Dow Chemical) | 0.04 | 5 |

EDTA - Ethylenediamine tetracetic acid
MBEDTA - Methyl-p-benzylethylenediaminetriacetic acid
Sym. EDDA - Sym. Ethylenediaminediacetic acid
DTDA - Diethyeneltriaminediacetic acid
DTPA - Diethylenetetraaminepentaacetic acid
TTHA - Triethylenetetraaminehexaacetic acid
CM - Carboxymethyl
PEI - Polyethyleneimine
PEOx - Polyethyleneoxazoline

EXAMPLE 10

NO Absorption Using Polymeric Chelate of Iron (II)

A number of polymeric chelates containing iron (II) were treated with NO in aqueous solution. The results are shown in Table III wherein the mole ration of NO to iron (II) is shown. The polymeric chelates absorb NO to an extent comparable to the monomeric chelates.

TABLE III

NITRIC OXIDE ABSORPTION BY IRON (II) CHELATES

| Chelator | Mole Ratio. N/Fe | Final pH | NO Absorbed mol/mol Fe | Appearance of Final System |
|---|---|---|---|---|
| None | — | 6.8 | 0.03 | ppt. present |
| HEIDA | 1 | 7.6 | 0.1 | some blue floc. |
| Sym. EDDA | 2 | 7.2 | 0.4 | much blue floc. |
| EDTA | 2 | 7.1 | 0.067 | clear, brown-green |
| HEDTA | 2 | 6.8 | 0.37 | clear, brown-green |
| DTDA | 3 | 7.0 | 0.23 | clear, brown-green |
| DTDA | 3 | 7.2 | 0.37 | much blue floc. |
| DTPA | 3 | 7.5 | 0.007 | clear, yellow |
| TTHA | 2 | 6.3 | 0.20 | clear |
| CM E-100 | 2 | 6.8 | 0.07 | much blue floc. |
| CM E-100 | 4 | 6.7 | 0.07 | clear |
| CM PEI 6 | 2 | 7.4 | 0.17 | much floc. |
|  | 3 | 7.2 | 0.10 | much floc. |
|  | 4 | 7.0 | 0.10 | clear, brown-green |
|  | 18 | 7.1 | 0.03 | clear, yellow-green |
| CM PEOx, DP 50 | 2 | 7.2 | 0.13 | much floc. |
|  | 2 | 7.5 | 0.28 | much floc. |
|  | 4 | 7.3 | 0.07 | small amount floc. |
| CM PEOx, DP 500 | 2 | 6.6 | 0.03 | no observ. |
| CM C-31 | 2 | 6.7 | 0.08 | much floc. |
| CM C-31 | 4 | 7.1 | 0.07 | clear |

Reaction Conditions:
120 ml of 0.025 M Fe (II) sulfate.
Temperature 55° C.
Gas flow: 1.2 liters/min. nitrogen containing 250 ppm NO.

EXAMPLE 11

Dialysis of Iron Polymeric Chelating Agents

In the dialysis, 100 ml of iron (II) organic chelate, made up to be about 0.1 molar in iron, was dialyzed into two liters of deionized water overnight. The CM PEI 150 and CM PEI 600 polymeric chelating agents were dialyzed through SPECTROPOR 1, from Van Waters & Rogers, San Francisco, Calif. which has a nominal molecular weight cut-off of about 6000–8000. In both cases, about 3–5% of the iron was lost. The CM PEI 6 solution was dialyzed through SPECTROPOR 6 (Van Waters & Rogers) which has a cut-off of about 2000. In this case about 10% of the iron was lost.

EXAMPLE 12

Ultrafiltration of Iron Polychelates

The ultrafiltration tests were performed in an Amicon Model 52 cell which is a cylindrical chamber with a 43 mm diameter (12.5 cm) membrane as the bottom surface. The cell volume is about 60 ml and the cell contains a suspended magnetic stirring bar to reduce polarization effects. In a run, a 25-ml volume of solution was placed in the cell and the gas space was connected to an air line maintained at 15 psi.

Three membranes were used for this study, all obtained from the Amicon Corporation of Danvers, Mass. They were designated as UM 05, UM 2 and PM 10 having nominal molecular weight cutoffs of 500, 1000 and 10,000, respectively. The iron was determined by the standard thiocyanate method.

The results are shown below in Table IV.

TABLE IV

ULTRAFILTRATION AND DIALYSIS OF IRON POLYCHELATES

| Polychelator | UM 05 Rejection % | UM 2 Rejection % | UM 2 Flow gsfd* | PM 10 Rejection % | PM 10 Flow gsfd* |
|---|---|---|---|---|---|
| CM PEI 600 | 89 | 98 | 1.3 | 91 | 6 |
| CM PEI 600 (dialyzed) |  | 99 | 2.8 | 95 | 16 |
| CM PEI 150 (dialyzed) |  | 95 | 1.4 | 97 | 9 |
| CM PEI 6 |  | 80–90 | 0.8 | 25 | 28 |
| CM PEI 6 (dialyzed) | 61 | 90 | <0.3 |  |  |
| CM E-100 | 84 | 92 | 0.6 | 27 | 40 |
| EDTA | 23 | 10 | 1 |  |  |
| Deionized H₂O only |  |  | 5 |  | 100 |

[CM PEI - Carboxymethyl polyethyleneimine, etc.]
Rejection % values are averages over steady state portion of run.
Flow values are interpolated or extrapolated to 0.10 M Fe.
Rejection % - the amount of chelate (or material) which did not pass through the membrane.
*gsfd = gal/ft² × day As can be seen from Table IV, polychelates based on carboxymethylated polyethyleneimine 6 (CM PEI 6, about 15 monomer units) or larger polymers are fairly well rejected by ultrafiltration membranes having cut-offs in the molecular weight range of 1000–10,000. CM PEI 6 is strongly rejected (80–90%) by Amicon UM 2 membrane (having a cut-off value of 1000), but poorly (20–30%) by PM 10 (cut-off 10,000). Higher polymers CM PEI 150 and CM PEI 600 are both strongly rejected 95–99% by both membranes.

At a concentration of 0.1M chelated iron (III) output from an Amicon UM 2 membrane is about 1 gallon per square foot per day (gsfd) with the polychelators of Table III at a pressure of 15 psi. For the PM 10 membrane, the output is 6–20 gsfd. Output was strongly dependent upon iron concentration.

EXAMPLE 13

Adsorption of NO with Polymeric Chelate of Fe(II) and Separation

The polymeric chelate of Example 1 containing Fe(II) at a concentration of 0.025M in Fe(II) and 0.050M in S₂O₃= is dialyzed using a Spectrapor 6 (2000 MW cut-off), area 4.5 cm². Na₂SO₄ (0.050M) is used as the dialysate solution. About 100 ml of dialysate is used. The permeability of the Fe(II)-chelate is $0.7 \times 10^{-2}$ cm/hr and for S₂O₃= is 0.6.

Additional permeabilities were obtained using the Fe(II) and Fe(III) chelate shown in Table V below.

TABLE V

PERMEABILITIES OF IRON CHELATES AND THIOSULFATE THROUGH A DIALYSIS MEMBRANE

Spectrapor 6 (2000 MW cut-off), Area = 4.5 cm²

| Fe CHELATE | FEED Conc. M | FEED (S₂O₃=) M | DIALY-SATE ml | P, cm/hr. Fe | P, cm/hr. S₂O₃= |
|---|---|---|---|---|---|
| — | — | 0.10 | ~80 | — | 0.5 |
| Fe III-EDTA | 0.050 | 0.050 | ~90 | $22 \times 10^{-2}$ | 1.1 |
| Fe III-CME-100 | 0.025 | 0.050(a) | 100 | $0.7 \times 10^{-2}$ | 0.6 |
| Fe II-CME-100 | 0.025 | 0.050(a) | 100 | $3.6 \times 10^{-2}$ | 0.6 |
| Fe III-CM PEI 6 | 0.06 | — | 90 | $0.37 \times$ |  |

TABLE V-continued

PERMEABILITIES OF IRON CHELATES AND
THIOSULFATE THROUGH A DIALYSIS MEMBRANE
Spectrapor 6 (2000 MW cut-off), Area = 4.5 cm$^2$

| Fe CHELATE | FEED | | DIALY- SATE ml | P. cm/hr. | |
|---|---|---|---|---|---|
| | Conc. M | ($S_2O_3^=$) M | | Fe | $S_2O_3^=$ |
| | | | | | $10^{-2}$ |

(*)0.050 M $Na_2SO_4$ used as dialysate solution; water used in other systems.

It is apparent from Table V that the polymeric chelates are not separated by dialysis through the membrane to the extent that the monomeric chelate is dialyzed.

EXAMPLE 13

Removal of NO and $SO_2$

A gas stream from an oil combustion unit having a concentration of NO of 0.011 weight percent and $SO_2$ of 0.03 weight percent enters a contact vessel which contains an aqueous solution containing 1.0 percent by weight of iron (II) (based on the total weight of the mixture) as the polymeric chelate of carboxymethyl polyethyleneimine CM PEI6. The chelate is supplied at 50% molar excess based on iron and the pH of the system is about 7. The pressure of the fluid gas is about 15 psig and the temperature of the reaction is 55° C. A contact time of 60 seconds is used. The NO and $SO_2$ are converted to $HN(SO_3)_2^=$ which remains in solution. The aqueous solution is then subjected to ultrafiltration using an Amicon UM2 membrane and apparatus. The CM PEI 6 is retained in the aqueous solution while the low molecular weight water and $HN(SO_3)_2^=$ are separated. The retained aqueous solution containing the CM PEI 6 Fe(II) is recycled to the contact vessel.

While only a few embodiments of the invention have been shown and described herein, it will become apparent to those skilled in the art that various modifications and changes can be made in the process to remove NO and $SO_2$ from fluid streams using polymeric organic chelates of a polyvalent metal without departing from the spirit and scope of the present invention. All such modifications and changes coming within the scope of the appended claims are intended to be covered thereby.

We claim:

1. A cyclic process for the removal of NO from a fluid stream comprising mixtures of NO and $SO_2$, which process comprises:

(A) contating the fluid stream in a contacting zone with an aqueous reaction solution at a temperature between about 10° and 90° C., the reaction solution itself comprising an effective amount of an organic water-soluble polymeric chelate wherein the chelate contains a polyvalent metal to absorb the NO present, wherein the polymeric chelate has a molecular weight of between about 500 and 1,000,000, and a backbone repeating unit polymer chain having pendant organic chemical groups able to chelate the metal ion present; and (B) separating the gas stream and the resulting aqueous phase produced in step (A) containing the polymeric chelate and imidodisulfonate;

(C) separating and purifying the aqueous solution produced in step (B) by membrane separation means effective to remove a portion of the water and other monomeric reaction products having a molecular weight of less than 500; and (D) recycling the concentrated aqueous solution containing the water-soluble polymeric chelate of step (C) to the contacting zone of step (A).

2. The cyclic process of claim 1 wherein in step (C) a portion of the aqueous solution is separated from the polymeric chelate by means selected from ultrafiltraton or dialysis.

3. The cyclic process of claim 2 wherein the means is ultrafiltration.

4. The cyclic process of claim 1 wherein in step (A) the polyvalent metal is iron.

5. The cyclic process of claim 3 wherein in step (A) the polyvalent metal is iron.

6. The cyclic process of claim 1 wherein in step (A) the watersoluble polymeric chelate has a molecular weight of between about 1,000 and 500,000.

7. The cyclic of claim 2 wherein the polyvalent metal is iron.

8. The cyclic process of claim 6 wherein in step (D) the aqueous solution is separated by means selected from ultrafiltration or dialysis.

9. A process for the removal of NO from a fluid stream comprising mixtures of NO and $SO_2$, which process comprises:

(A) contacting the fluid stream in a contacting zone with an aqueous reaction solution at a temperature of between about 10° and 90° C., the reaction itself comprising an effective amount of a water-soluble organic polymeric chelate, containing a polyvalent metal to absorb the NO present, wherein the polymeric chelate has a molecular weight of between about 500 and 1,000,000 and pendant chelating groups is selected from chelates of the formula:

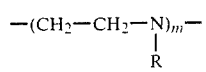
(a)

wherein R is $-CH_2COOH$, $-CH_2CH_2COOH$, $-CH_2-P(=O)(OH)_2$,

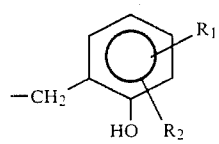

wherein $R_1$ and $R_2$ are independently $-CH_3$, $-SO_3H$, $-Cl$, $-H$, $-COOH$, and m is an integer between about 5 and 20,000;

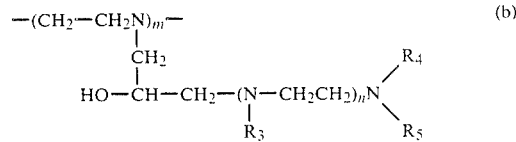
(b)

wherein $R_3$, $R_4$ and $R_5$ are each independently selected from R wherein R is as defined hereinabove, m is an integer between about 5 and 20,000; and n is 0, 1, 2, 3 or 4;

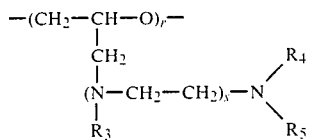

wherein $R_3$, $R_4$ and $R_5$ are as defined hereinabove; r is an integer between about 10 and 20,000, s is an integer between about 1 and 4;

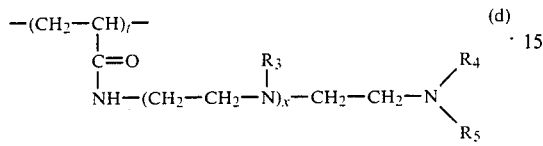

wherein $R_3$, $R_4$ and $R_5$ are as defined hereinbove; t is an integer between about 10 and 20,000 and x is an integer between about 1 and 4;

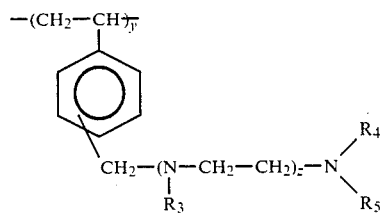

wherein $R_3$, $R_4$ and $R_5$ are as defined hereinabove, y is an integer between about 10 and 20,000; z is an integer between about 1 and 4;

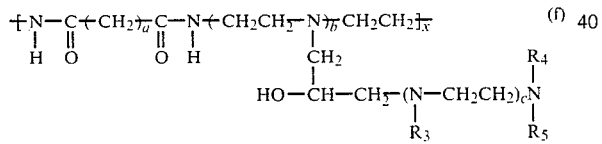

where $R_3$, $R_4$ and $R_5$ are as defined hereinabove, where x is between about 10 to 10,000, a is about 6, b is between about 1 and 4, and c is between about 1 and 4;

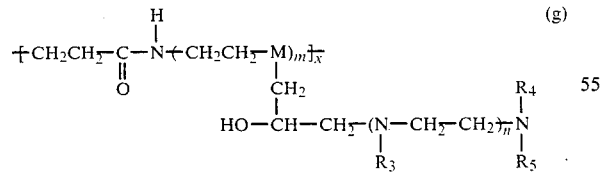

where m, x, n and $R_3$, $R_4$ and $R_5$ are as defined hereinabove; or

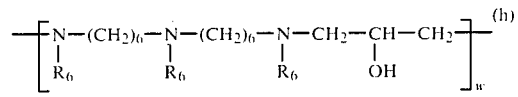

wherein $R_6$ is $-CH_2$ or $-H$;

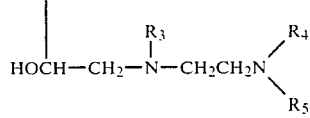

wherein $R_3$, $R_4$ and $R_5$ are as defined hereinabove; and w is between about 2000 and 4000;

(B) separating the fluid stream and the resulting aqueous phase containing the polymeric chelate . iron (II) and imidodisulfonate of step (A);

(C) concentrating the aqueous phase repeated in step (B) by membrane separation means effective to remove a portion of the water and other monomeric reaction products having a molecular weight below 500 and;

(D) recycling the concentrated aqueous solution containing the water soluble polymeric chelate produced in step (C) to the contacting zone of step (A).

10. The process of claim 4 wherein in step (C) a portion of the aqueous solution is separated from the polymeric chelate by means selected from ultrafiltration and dialysis.

11. The process of claim 10 wherein the means for removal in step (C) is ultrafiltration.

12. The process of claim 10 wherein in step (A) the polymeric chelate has a molecular weight of between about 1,000 and 500,000.

13. The process of claim 10 wherein in step (A) the metal is iron.

14. The process of claim 9 wherein the water-soluble chelate has the formula of chelate (C):

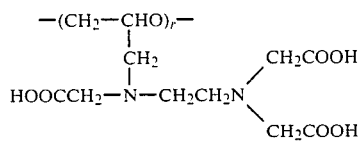

wherein r is between about 15 and 20.

15. The process of claim 14 wherein the organic water-soluble chelate has a molecular weight of between about 1,000 and 500,000.

16. The process of claim 14 wherein the polyvalent metal is iron.

17. The process of claim 14 wherein the concentration of the aqueous solution in step (C) is performed by means which is ultrafiltration.

* * * * *

UNITED STATES PATENT AND TRADEMARK OFFICE
CERTIFICATE OF CORRECTION

PATENT NO. : 4,708,854

DATED : November 24, 1987

INVENTOR(S) : Robert R. Grinstead

It is certified that error appears in the above-identified patent and that said Letters Patent is hereby corrected as shown below:

In OTHER PUBLICATIONS on cover sheet, delete "P. R. Klinkowski" and insert -- P. E. Klinkowski --;

In ABSTRACT on cover sheet, fifth line, "solution" has been misspelled;

Col. 4, lines 37-44, change formula (g) as follows:

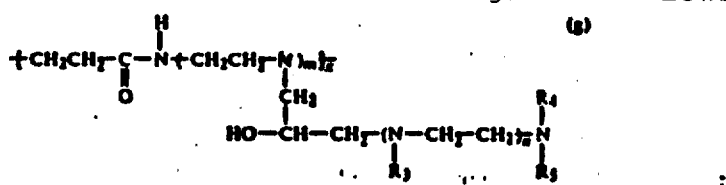

Col. 9, line 23, delete "of" and insert -- at --;

Col. 9, line 63, delete "0.01" and insert -- 0.1 --;

Col. 10, line 28, delete "to" and insert -- in --;

Col. 11, line 12, delete "of" and insert -- to --;

Col. 11, line 29, delete "at" and insert -- to --;

Col. 12, line 39, "point" and "precipitation" have been misspelled;

Col. 12, line 54, "Diethylenetriaminediacetic" has been misspelled;

UNITED STATES PATENT AND TRADEMARK OFFICE
CERTIFICATE OF CORRECTION

PATENT NO. : 4,708,854
DATED : November 24, 1987
INVENTOR(S) : Robert R. Grinstead It is certified that error appears in the above-identified patent and that said Letters Patent is hereby corrected as shown below:

Col. 14, line 17, "100" should be shown at column titled "Flow gsfd*" instead of "Rejection %";

Col. 14, line 39, delete "6-20" and insert -- 6-30 --;

Col. 15, line 52, "contacting" has been misspelled;

Col. 16, line 20, after "cyclic" insert -- process --;

Col. 16, line 46, insert -- or --;

Col. 17, lines 52-58, change formula(g) as follows:

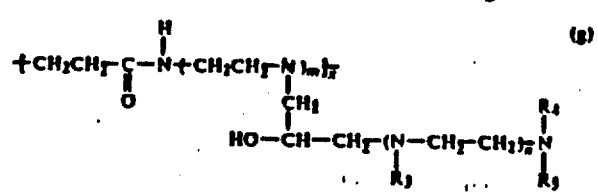

Signed and Sealed this

Seventh Day of February, 1989

Attest:

DONALD J. QUIGG

Attesting Officer

Commissioner of Patents and Trademarks